(12) United States Patent
de Heer et al.

(10) Patent No.: US 8,352,982 B2
(45) Date of Patent: Jan. 8, 2013

(54) SERVICE SUBSTITUTION TECHNIQUES

(75) Inventors: David L de Heer, Woodside, CA (US);
Majd Bakar, San Jose, CA (US);
Francis W Tsui, Belmont, CA (US);
Victor S Lee, Cupertino, CA (US);
Sivaprasad Lakshmi Radhakrishnan,
Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 888 days.

(21) Appl. No.: 12/016,307

(22) Filed: Jan. 18, 2008

(65) Prior Publication Data

US 2009/0187938 A1 Jul. 23, 2009

(51) Int. Cl.
*H04N 7/025* (2006.01)
(52) U.S. Cl. .............................. 725/35; 725/32; 725/38
(58) Field of Classification Search ....................... 725/35
See application file for complete search history.

(56) References Cited

U.S. PATENT DOCUMENTS

| | | | | |
|---|---|---|---|---|
| 5,065,151 | A * | 11/1991 | Sandbrand ............... | 340/825.22 |
| 5,235,643 | A * | 8/1993 | Anderson et al. ................ | 380/33 |
| 6,157,719 | A * | 12/2000 | Wasilewski et al. .......... | 380/210 |
| 6,434,621 | B1 * | 8/2002 | Pezzillo et al. .............. | 709/231 |
| 7,277,486 | B2 | 10/2007 | Srinivasan et al. | |
| 7,523,477 | B2 * | 4/2009 | Ellis ............... | 725/50 |
| 2001/0025377 | A1 | 9/2001 | Hinderks | |
| 2004/0083487 | A1 * | 4/2004 | Collens et al. ................. | 725/31 |
| 2004/0255329 | A1 | 12/2004 | Compton et al. | |
| 2006/0200412 | A1 * | 9/2006 | Fahrny et al. .................... | 705/50 |
| 2007/0074260 | A1 * | 3/2007 | Elstermann | |
| 2007/0198839 | A1 | 8/2007 | Carle et al. | |
| 2007/0226765 | A1 * | 9/2007 | Bahnck et al. .................. | 725/63 |

FOREIGN PATENT DOCUMENTS

WO WO2005099333 A2 10/2005

OTHER PUBLICATIONS

"Multimedia Data Delivery by Satellite and IP Multicasting", Motorola, Inc. 1999., pp. 12.
Park, et al., "Hybrid Monitoring Scheme for Real-time Media Delivery over the Multicast Network", Proceedings of 18th APAN Network Research Workshop, 2004, pp. 7.
Bansal, et al., "Path Diversity Based Techniques for Resilient Overlay Multimedia Multicast", Picture Coding Symposium (PCS) 2004, pp. 6.
"FLO Technology", QUALCOMM Incorporated, 2005. Pages 4.

* cited by examiner

*Primary Examiner* — Pankaj Kumar
*Assistant Examiner* — Timothy Newlin
(74) *Attorney, Agent, or Firm* — Wolfe-SBMC (57) ABSTRACT

Service substitution techniques are described. In an implementation, a substitution table is derived that specifies one or more service substitutions to be performed for content and that specifies particular geographic locations to perform at least one service substitution. One or more communications are formed to be streamed over a packet-switched network to a client that is to perform the at least one service substitution. The one or more communications include the substitution table and the content that corresponds to the at least one service substitution.

17 Claims, 4 Drawing Sheets

SERVICE SUBSTITUTION TECHNIQUES

BACKGROUND

Service substitutions (e.g., "blackouts") occur when content that's supplied on one video service is to be removed or replaced by a static message or supplanted by content from a different service for a limited window of time. For example, service substitutions are widely used in the United States for sports programming. This feature is used even more widely on a global basis, such as to substitute local program sources for United States sources in Canada and for other creative reasons by other network operators.

Traditional industry implementations performed the substitution by switching video encoders that source the content. Thus, the traditional industry implementations relied on creating "bottlenecks" at different stages of the content distribution process using expensive devices to limit access to the content and therefore substitute content that is not to be viewed at a particular location with other content. Equipment that was used to implement these traditional techniques, however, was often expensive to employ. Further, these traditional techniques do not address modern techniques that have been developed to communicate content.

SUMMARY

Service substitution techniques are described. In an implementation, a substitution table is derived that specifies one or more service substitutions to be performed for content and that specifies particular geographic locations to perform at least one service substitution. One or more communications are formed to be streamed over a packet-switched network to a client that is to perform the at least one service substitution. The one or more communications include the substitution table and the content that corresponds to the at least one service substitution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Service substitutions (e.g., "blackouts") occur when content that's supplied via a particular service provider is to be removed or replaced by a static message or supplanted by content from another service provider for a limited window of time. Traditional industry implementations performed the substitution by switching video encoders that source the content, thus creating "bottlenecks" at different stages of the content distribution process. However, these techniques are not equally applicable to situations in which clients have access to content regardless of location, such as via an Internet Protocol (IP) network, and therefore do not have traditional "bottlenecks" that may be supplied by video encoders or other such devices.

Techniques are described to provide service substitutions, such as to "blackout" particular television content and replace it with other television content. In an implementation, software is utilized to implement a service substitution system via an IP network (e.g., the Internet) without using traditional video encoders, which were expensive and offered limited scalability.

In the following discussion, an exemplary environment is first described that is operable to provide service substitution techniques. Exemplary procedures are then described which may be employed in the exemplary environment, as well as in other environments.

Exemplary Environment

Figure 1:
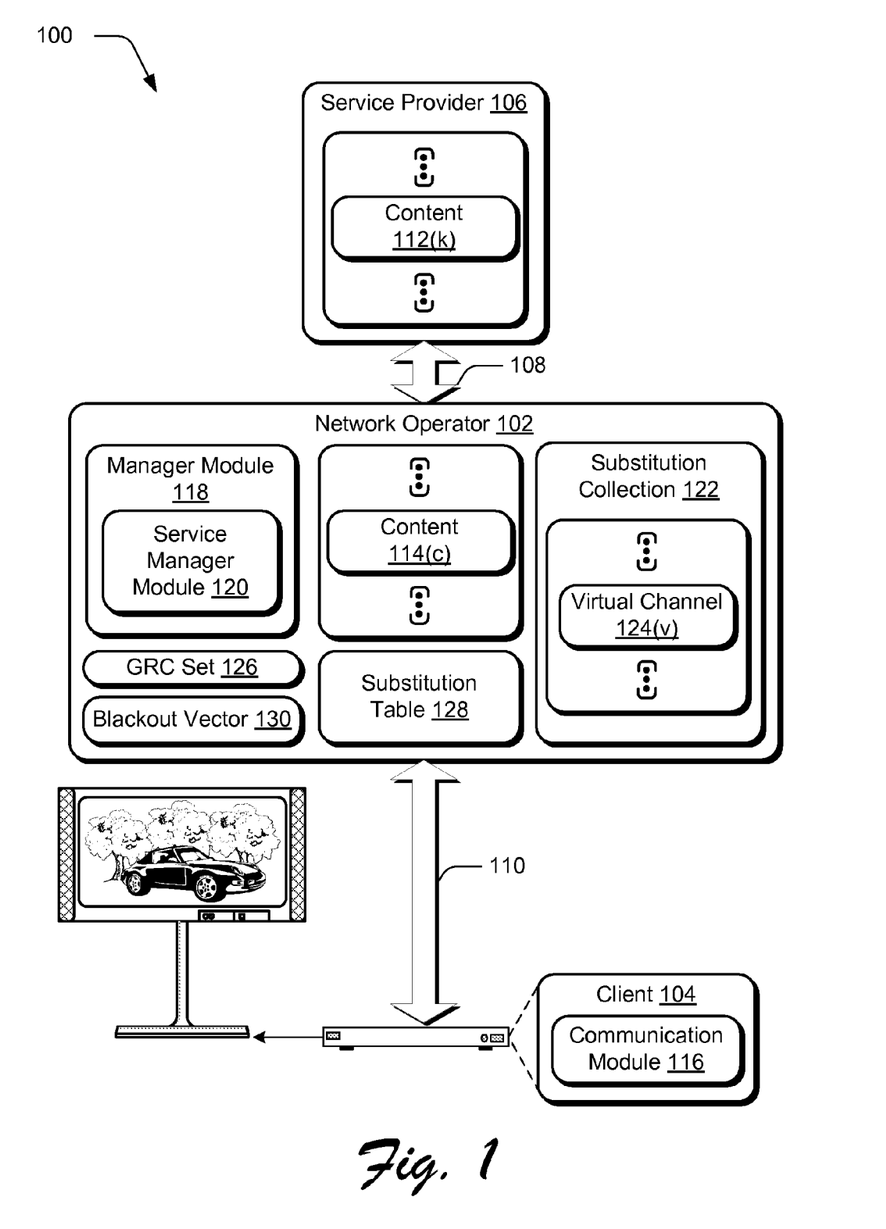
FIG. 1 is an illustration of an environment in an exemplary implementation that is operable to employ service substitution techniques.

FIG. 1 is an illustration of an environment 100 in an exemplary implementation that is operable to employ service substitution techniques. The illustrated environment 100 includes a network operator 102, a client 104 and a service provider 106 that are communicatively coupled via network connections 108, 110. Although a single entity is shown, respectively, for the network operator 102, the client 104, and the service provider 106 in FIG. 1, it should be readily apparent that each of these illustrated entities may also be representative of a plurality of entities without departing from the spirit and scope thereof.

The client 104 may be configured in a variety of ways. For example, the client 104 may be configured as a computer that is capable of communicating over the network connection 110, such as a desktop computer, a mobile station, an entertainment appliance, a set-top box communicatively coupled to a display device, a wireless phone, a game console, and so forth. For purposes of the following discussion, the client 104 may also relate to an entity that operates the client. In other words, client 104 may describe logical clients that include users, software and/or devices.

The network connections 108, 110 may assume a wide variety of configurations. For example, network connection 110 may include a wide area network (WAN), a local area network (LAN), a wireless network, a public telephone network, an intranet, a broadcast network with backchannel communication, and so on. The network connection 110, for instance, may be implemented via an Internet Protocol (IP) network using packet-switching techniques.

The service provider 106 includes one or more items of content 112($k$), where "k" can be any integer from 1 to "K". The content 112($k$) may include a variety of data, such as television programming that may include video-on-demand (VOD) files. The content 112($k$) is communicated over the network connection 108 to the network operator 102.

Content 112($k$) communicated via the network connection 110 is received by the network operator 102 and may be stored as one or more items of content 114($c$), where "c" may be an integer from one to "C". The content 114(*c*) may be the same as or different from the content 112(*k*) received from the service provider 106. The content 114(*c*), for instance, may include additional data for broadcast to the client 104, such as electronic program guide (EPG) data.

The client 104, as previously stated, may be configured in a variety of ways to receive the content 114(*c*) over the network connection 110, such as to immediately output the content 114(*c*) as it is received and/or record the content 114(*c*) for later output using "time shifting" techniques, e.g., as a digital video recorder (DVR). The client 104 typically includes hardware and software to transport and decrypt content 114(*c*) received from the network operator 102 for rendering by the illustrated display device. Although a display device is shown, a variety of other output devices are also contemplated, such as speakers.

The client 104 includes a communication module 116 that is representative of functionality on the client 104 to control content playback on the client 104, such as through the use of one or more "command modes". The command modes may provide non-linear playback of the content 114(*c*) (i.e., time shift the playback of the content 114(*c*)) such as pause, rewind, fast forward, slow motion playback, and the like.

The network operator 102 is illustrated as including a manager module 118. The manager module 118 is representative of functionality to configure content 114(*c*) for output (e.g., streaming) over the network connection 110 to the client 104. The manager module 118, for instance, may configure content 112(*k*) received from the service provider 106 to be suitable for transmission over the network connection 110, such as to "packetize" the content for distribution over the Internet, configuration for a particular broadcast channel, map the content 112(*k*) to particular channels, and so on.

Thus, in the environment 100 of FIG. 1, the service provider 106 may broadcast the content 112(*k*) over a network connection 108 to a multiplicity of network operators, an example of which is illustrated as network operator 102. The network operator 102 may then stream the content 114(*c*) over a network connection 110 to a multitude of clients, an example of which is illustrated as client 104. The client 104 may then output the content 114(*c*) immediately and/or store the content 114(*c*) in a storage device, such as when the client 104 is configured to include digital video recorder (DVR) functionality.

The manager module 118 is illustrated as including a service manager module 120 that is representative of techniques to implement service substitutions, such as "blackouts". In an implementation, the manager module 118 is implemented as software that is utilized to provide a service substitution system via an IP network (e.g., the Internet) without using traditional video encoders, which were expensive and offered limited scalability. In an implementation, the service manager module 120 may employ the following features to implement the service substitution techniques.

Substitution Collection 122

A substitution collection 122 is a group of services (i.e., content 112(*k*) from service providers 106) that may be substituted for each other during a blackout. In an implementation, substitution collections 122 are non-intersecting. That is, each service within a channel map belongs to a single substitution collection 122. Further, in an implementation, these services may exist "outside" a substitution collection, but, in that case such services are not involved in blackouts.

An example of a substitution collection 122 is a group of sports programming network (SPN) channels (e.g., a "SPNx" substitution collection) that may be substituted for each other. For instance, this substitution collection 122 may include SPN1 and SPN2 (primary channels); SPNa, SPNb, SPNc, SPNd, and SPNe (alternate channels); and SPNjpeg (a "still" channel).

Virtual Channel 124(*v*)

The substitution collection 122 is illustrated as including one or more virtual channels 124(*v*), where "v" may be an integer from one to "V". A virtual channel 124(*v*) is a video or JPEG service which nominally comes from a particular source (e.g., a multicast video stream, a JPEG URL, and so on) but can be substituted by another service in its substitution collection 122. The virtual channel 124(*v*) may nominally be a channel that is mapped into an electronic program guide (EPG), and if it does, the location in the EPG for the channel does not change while the service is being substituted.

As an example, the SPN1 virtual channel may "show up" in the SPN1 location on an electronic program guide (EPG), and may normally contain the SPN1 primary channel video stream. During a blackout, however, the SPN1 virtual channel may have streaming content from one of the other services in the SPNx substitution collection. Therefore, before and after a service substitution (e.g., a blackout), the tuning to the SPN1 virtual channel may result in a display of content from the SPN1 service, but during a blackout it might show content from SPNa, then SPNd, and then SPN2.

GRC Set 126

A GRC may be referred to as a "geographic region code" that specifies particular geographic locations, but conceptually may be thought of as a code that groups client devices together uniquely for each substitution collection 122 into a set of GRCs, for example. The clients (e.g., client 104) that have access to services within a substitution collection 122 belong to at least one GRC in a GRC set 126 used for a blackout in the substitution collection 122. The full set of GRCs for each substitution collection 122 makes up the GRC set 126.

Substitution Table 128

The substitution table 128 maps virtual channels in a substitution collection 122 to the services that clients in each GRC in the GRC set 126 are to display. During non-blackout times, the content of the substitution table 128 maps the virtual channels 124(*v*) to respective normal services. During a blackout, however, the substitution table 128 maps the virtual channel to whatever services each GRC in the GRC set 126 are to display at the time of interest. In an implementation, the absence of a substitution table 128 for a substitution collection 122 may be interpreted as a "nominal" substitution table, where each virtual channel 124(*v*) is mapped to a respective nominal service and thereby optimizes provision of the substitution table.

Each service within a substitution collection 122 may correspond to the same substitution table 128. That way, each service may be mapped into a virtual channel 124(*v*) at a variety of times with no ambiguity of state for the client.

Blackout Vector 130

The blackout vector 130 may be configured as a bit-mapped data structure that is carried in the DRM information of the services in a substitution collection 122. The blackout vector 130 contains one entry for each GRC in the current GRC set, and each entry indicates if the service carrying the vector is decodable by clients (e.g., client 104) that are members of the GRC. The "zeroth" bit in the vector indicates if clients in the "zeroth" GRC in the GRC set may decode the service. The first bit in the vector indicates if the clients in the first GRC in the GRC set can decode the service, and so on to the 255th bit in this example.

By matching the bit position in the blackout vector 130 to the individual client's GRC membership, the secure core on the client 104 (e.g., the communication module 116) may enforce blackouts with high reliability.

Figure 2:
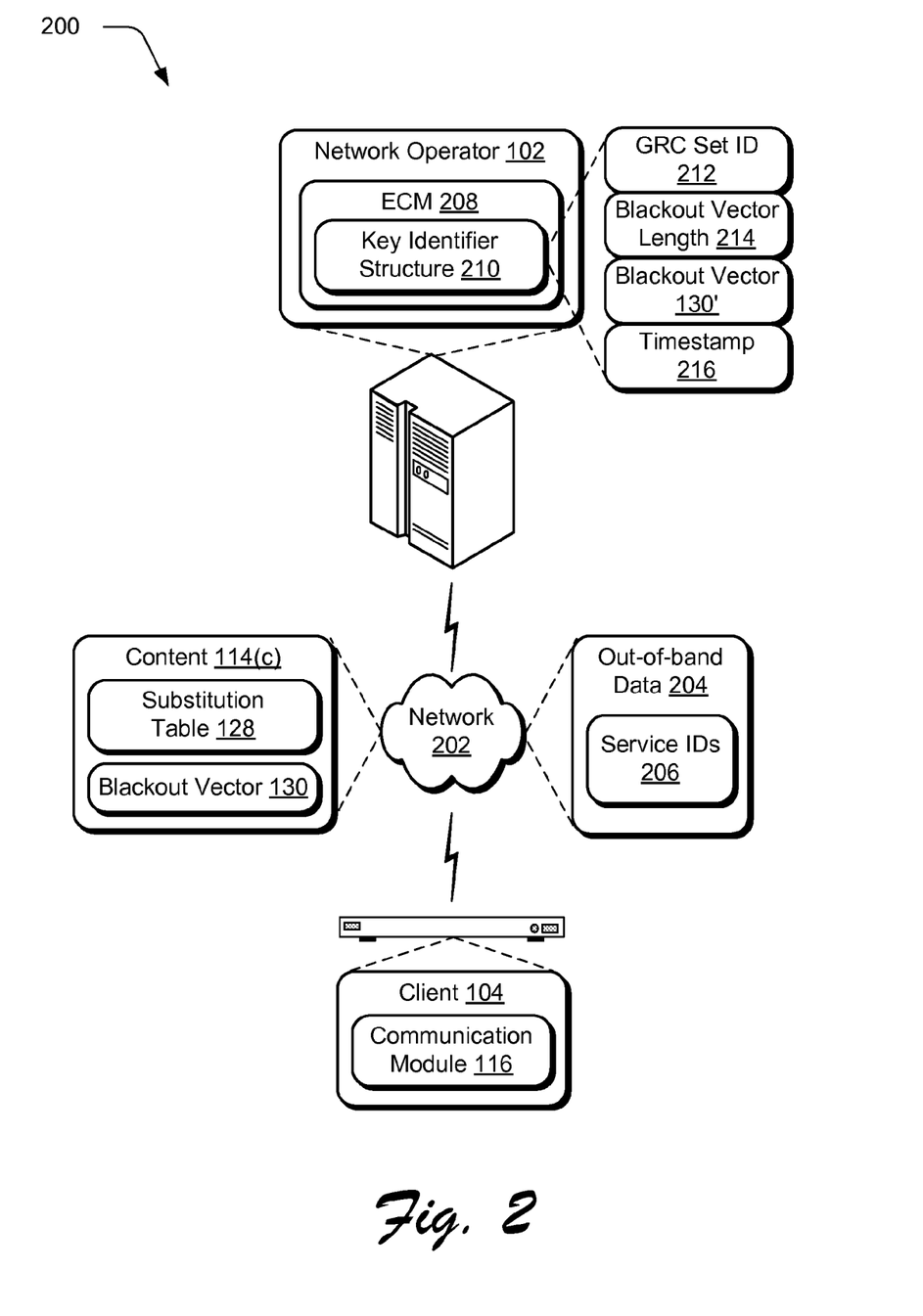
FIG. 2 is an illustration of a system in an exemplary implementation showing a client and a network operator of FIG. 1 in greater detail.

FIG. 2 depicts a system 200 in an exemplary implementation showing the client 104 and the network operator 102 of FIG. 1 in greater detail. The network operator 102 of FIG. 2 is illustrated as being implemented by a server and the client 104 is illustrated as a client device. Accordingly, the network operator 102 and the client 104 may each incorporate a processor and computer-readable medium. Additionally, the network operator 102 and the client 104 are illustrated as being connected via an IP network 202, e.g., the Internet, which may use packet-switching techniques to communicate, one with another.

Communication via the network 202 between the network operator 202 and the client 104 may be performed in a variety of ways. The client 104, for instance, may receive a stream of content 114(c) that includes the substitution table 128 and the blackout vector 130 while receiving out-of-band data 204, which is illustrated as including service IDs 206 using "out-of-band" communication techniques. In this way, the network operator 102 may balance the desires of providing quick notification of service substitutions within bandwidth constraints, further discussion of which may be found in the following sections.

Substitution Collections

As previously described, sets of services that can be substituted for each other are organized into substitution collections. The substitution collections are largely static. The client 104 may be sent (e.g., via the out-of-band data 204) service IDs 206 for services within each substitution collection and an ordinal assigned to each service. This allows the client 104 to derive the appropriate information from substitution tables 128, which may be compressed.

The substitution collection mappings may be updated to the client 104 as part of service information (SI) data update. An API (e.g., SendDataRefreshNotification) may be used to propagate SI information from the network operator 102 to one or more clients 104. In an implementation, each service may be included in a single substitution collection, and not more.

GRC Sets

In an implementation, clients that have access to substitution collections are assigned to up to 64 GRCs—one for each possible GRC set. The mapping of the "universe" of clients 104 to GRCs within the GRC set may happen in a variety of different ways, such as by several hours before respective usage in a blackout. Each GRC set may be inclusive of each client 104 that could access the services (e.g., content 114(c)) within the substitution collection 122 of FIG. 1.

In a non-limiting implementation, each of the 64 GRC sets may be used by each substitution collection 122, but a single GRC set is to be used at a single point in time within a particular substitution collection. Note that each GRC set 126 used includes clients 104 that may access one or more services (e.g., content 112(k)) in the associated substitution collection. In the current example, there may be up to 256 GRCs ("elements") in a GRC set, although other numbers are also contemplated.

A client's membership in respective GRCs may be communicated to the client in a variety of ways, such as whenever AV session information is updated that is used to permit access to the content 114(c). This may occur at predetermined intervals (e.g., nominally every 8 hours) to keep the client/server communication load to a minimum while still allowing the desired flexibility to modify GRC-to-client mappings. Note that if a DVR recording spans changes to a client's GRC membership, the recording may store the most recent membership alone.

ECM Usage

Entitlement control message (ECM) 210 information in the content stream (e.g., communicated with the content 114(c)) may be used to carry (amongst other things) a key identifier structure 210. The key identifier structure 210 points to one or more keys (e.g., boundary keys) that were used to encrypt the content 114(c). In addition, the system 200 may add additional information to the key identifier structure 210 to cryptographically enforce a blackout/substitution, examples of which are as follows.

GRC Set ID 212 (e.g., 8 Bits)

This is a numeric field containing a value in the range of zero to 64 and thereby identifying the GRC set associated with the range of samples governed by this key ID.

Blackout Vector Length 214 (e.g., 4 bits) A numeric field containing a value in the range 0 . . . 15. A value of N means that there are 2*8*N bits of blackout vector flags present in the structure.

Blackout Vector 130' (e.g., 16*N Bits)

The blackout vector may be configured as an array of 8-bit bytes considered as bit flags with indices in the range 0 . . . 16*N−1. Earlier bytes contain bits with lower-numbered indices, while within a byte less significant bits have lower-numbered indices. As an example, if a client is a part of GRCn, then the client looks at bit "n" in the blackout vector. Thus, n is used as an index into the blackout vector. Decryption may be permitted when a supplied decryption key (e.g, a boundary key) belongs to a GRC in the designated GRC set and the bit corresponding to that GRC's index is set to 1.

Timestamp 216 (e.g., 4 Bytes)

This timestamp may be used to verify that a substitution group membership token has been issued not less than a predetermined amount of time (e.g., a few hours) from a timestamp in the keyID. This is to prevent someone from replaying all the substitution group membership tokens captured at a much earlier time.

Key Identifier Data Structure

Exemplary members of a key identifier data structure are summarized in the table below.

| Element Name | Description |
| --- | --- |
| StartSampleID | ID of first sample for which this key is valid |
| SampleIDlength | Number of samples over which this key can be used |
| KeyID | Key Identifier GUID |
| Substitution Group Set | A numeric field containing a value in the range 0 . . . 64 and thereby identifying the GRC set associated with the range of samples governed by this key ID. |
| Blackout Vector Length | A numeric field containing a value in the range 0 . . . 15. A value of N means that there are 2 * 8 * N bits of blackout groups access flags present in the structure; |

| Element Name | Description |
|---|---|
| Blackout Vector | 16 * N bits: Blackout groups access flags . . . An array of 8-bit bytes (always a multiple of two) considered as bit flags with indices in the range 0 . . . 16 * N − 1. |
| Blackout Timestamp | 4 bytes timestamp value for blackouts |
| Signature | Signature of this structure formed using the key specified by the KeyID |

Substitution Tables

As previously described, substitution information may be sent "in-band" (e.g., with) affected video streams, e.g., the content 114(c). For example, substitution tables may be sent in RTP header extensions within a video stream, e.g., the stream of content 114(c). Services within a substitution collection may each use a same substitution table. That way, a service may be mapped into a virtual channel at any point in time, and there is no ambiguity or state that is to be maintained by the client device.

While the substitution table 128 carries the mapping of virtual channels to the services that are to be displayed, the blackout vector 130 informs the client's secure core if the current stream may be decoded. In an implementation, the substitution table 128 is carried in a real-time protocol (RTP) header extension, e.g., approximately once per RAP such as every half second. The blackout vector 130 may be carried in the stream's ECM along with a pointer (i.e., a version number) for the in-force substitution table.

Substitution Table Example

Substitution tables contain the information used to map virtual channels to the service that is to be displayed on that virtual channel. The substitution table may include:

Table format version;
Table start use time—e.g., a network time protocol (NTP) time at which this table comes into effect;
GRC Set Number used for this blackout (e.g., a value between 0-64);
Per-table Signature; and
Matrix of virtual channels versus GRCs in the GRC set indicating which service is shown, an example of which is as follows in which SPN2 is substituted with SPNc:

Compression and Limits to Table Size

The data bandwidth used to transmit the substitution table 128 may be reduced by compressing the table. This may be done by making some assumptions about table usage—primarily that for large tables most GRCs will not be "blacked out" at any one time, and that, again for large tables, many of the virtual channels will not have GRCs "blacked out".

In order to compress the substitution table, for example, the network operator 102 may examine rows in the table and note rows that have a value that is not the nominal value. For example, in the above Table 2, the row for GRC 1 shows a substitution. Then the network operator 102 may examine each of the columns and note columns that have a value that is not nominal. In the above table, for instance, this is the column for SPN2.

The network operator 102 may then send a compressed substitution table as follows. First, a bit map is computed of affected rows (e.g., 256 bits or 32 bytes) which may be called a "Group Substitution Header". Second, a bit map of the affected columns is computed (e.g., 32 bits or 4 bytes) which may be called a "Virtual Channel Header". Third, cells in the substitution table 128 are generated that are at the intersection of the affected rows and columns. In an implementation, each cell may be up to five bits wide (e.g., to support up to 32 virtual channels), which may be called a "Substitution Map". The transmitted cell width is configured to be wide enough to hold a smallest power of two that may represent the number of affected columns.

Additionally, since the size of individual entries in a substitution table can be a variable number of bits, padding bits may be added to allow all rows to end on byte boundaries. The bits padded at the end of each substitution table row may

| Version = 4 | Start Time = 07:00 | GRC Set No. = 4 | Signature = 123456 | | | | | |
|---|---|---|---|---|---|---|---|---|
| GRC/VC | SPN1 | SPN2 | SPNa | SPNb | SPNc | SPNd | SPNe | SPNjpeg |
| 0 | SPN1 | SPN2 | SPNa | SPNb | SPNc | SPNd | SPNe | SPNjpeg |
| 1 | SPN1 | SPNc | SPNa | SPNb | SPNc | SPNd | SPNe | SPNjpeg |
| 2 | SPN1 | SPN2 | SPNa | SPNb | SPNc | SPNd | SPNe | SPNjpeg |
| 3 | SPN1 | SPN2 | SPNa | SPNb | SPNc | SPNd | SPNe | SPNjpeg |
| . . . | . . . | . . . | . . . | . . . | . . . | . . . | . . . | . . . |
| 255 | SPN1 | SPN2 | SPNa | SPNb | SPNc | SPNd | SPNe | SPNjpeg |

In an implementation, the items in bold are implied and therefore not sent as part of the substitution table 128. SPN1 to SPNjpeg are the services in the substitution collection. In an example, there are a maximum of 32 services in a service collection, and so there are a maximum of 32 columns in the table. GRCs 0 to 255 are the GRCs in the GRC set whose IDs are in GRC set ID 4.

Each table may contain a signature that is used by the client secure core to authenticate the values in the table. The table also includes the version number, the start time, and the GRC set number.

consequently be referred to as "Padding Bits", e.g., the number of padding bits is between 0 and 7.

The size of the substitution table in this example is as follows:

| Substitution Table Size = | |
|---|---|
| Header Bytes | 43 Bytes (or 344 bits) + |
| Signature & Key ID | 32 Bytes (or 256 bits) + |

| | |
|---|---|
| Table Size | = $N_V * ((N_G * B) + P)$ bits |
| | where |
| | $N_V$ - no. of virtual channels |
| | $N_G$ - no. of GRCs |
| | B - Bits per cell |
| | P - Padding bits |

The number of virtual channels sent in the compressed substitution table is computed from each of the virtual channels for which at least one GRC is set to use a service other than the nominal service. The number of GRCs sent in the compressed substitution table includes each of the GRCs for which at least one virtual channel is set to a service other than the nominal service.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices. The features of the service substitution techniques described below are platform-independent, meaning that the techniques may be implemented on a variety of commercial computing platforms having a variety of processors.

Exemplary Procedures

The following discussion describes service substitution techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
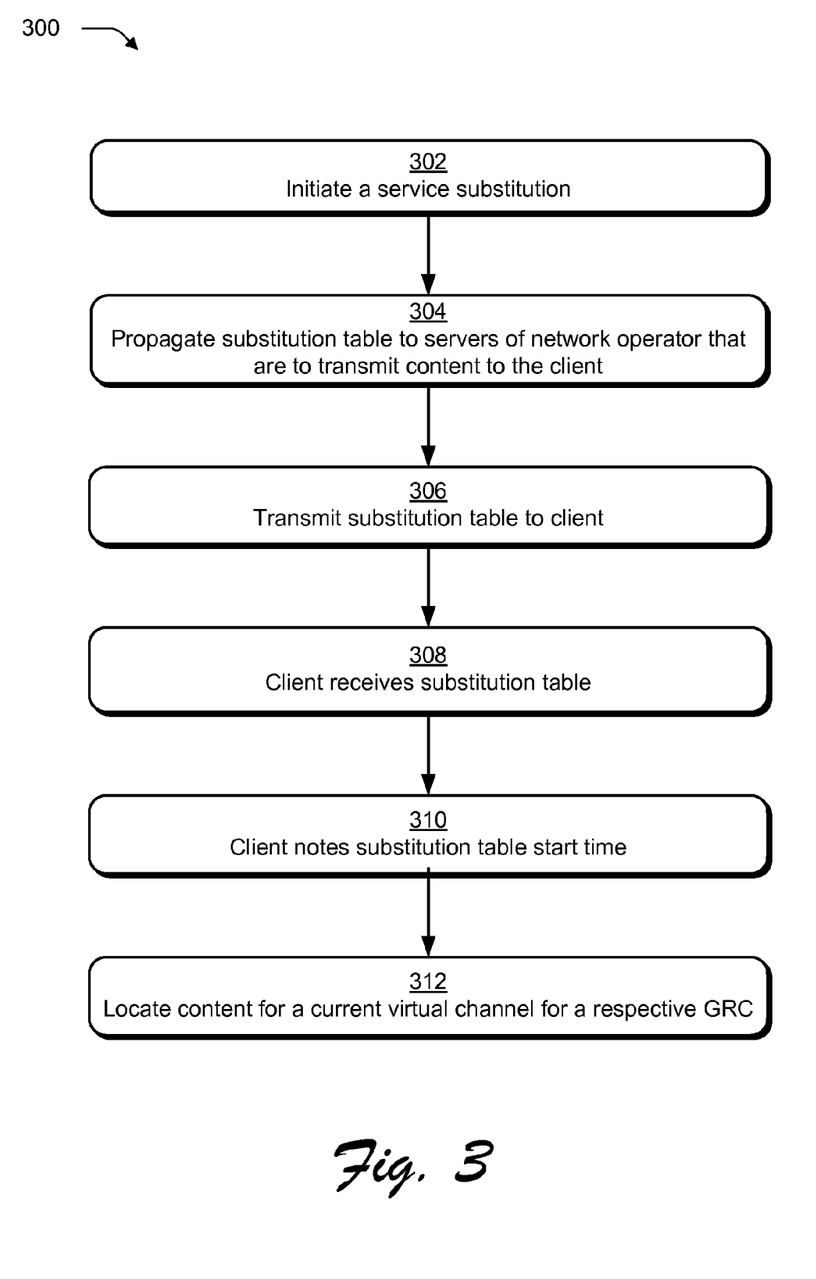
FIG. 3 is a flow diagram depicting a procedure in an exemplary implementation in which a service substitution is initiated, modified and ended.

FIG. 3 depicts a procedure 300 in an exemplary implementation in which a service substitution is initiated, modified and ended. A service substitution is initiated, e.g., a "blackout", (block 302). For example, the blackout may be initiated by calling a back-end of the network operator 102 with a "filled-out" substitution table 128. The substitution table 128 may include an NTP time in the future when the substitution table 128 is to be implemented (e.g., "comes into force"), a substitution collection ID against which the substitution table is to be applied and a GRC set ID in use for the substitution collection.

The video acquisition back-end logic applies the start time to the substitution table and the substitution table is propagated to each video acquisition server of the network operator 102 that feed services that are part of the substitution collection (block 304). This implies that services within the same back-end may be grouped within one substitution collection, but not others.

At the start time, the video acquisition server of the network operator 102 begin transmitting the substitution table (block 306) on services (e.g., content 114(c)) within the substitution collection.

Upon receiving a substitution table (block 308), a client will note the table start time (block 310), locate content for a current virtual channel for a respective GRC (block 312), and, if there is a corresponding retune, set an event to retune. Otherwise, the client 104 may ignore the substitution table 128 and need not parse future substitution tables with the same start time.

Figure 4:
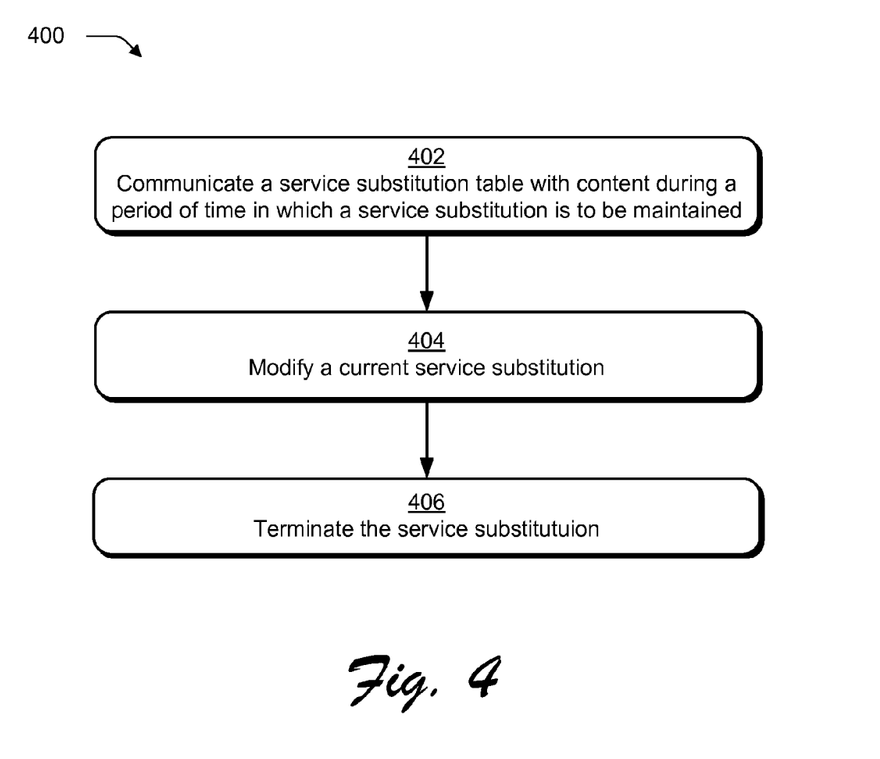
FIG. 4 is a flow diagram depicting a procedure in an exemplary implementation in which a service substitution is maintained, modified and terminated.

FIG. 4 depicts a procedure 400 in an exemplary implementation in which a service substitution is maintained, modified and terminated. A network operator 102 communicates a substitution table 128 during a period of time in which a service substitution is to be maintained (block 402).

While a blackout is occurring, for instance, video acquisition servers of the network operator 102 may continue to send the substitution table 128 in each of the services of the substitution collection. As clients 104 tune into a service in the substitution collection during the blackout, the clients 104 examine the substitution table 128 in a manner as described at the start of a blackout. Since the start time is in the past, the retune is applied immediately if applicable.

A current service substitution is modified (block 404). Continuing with the previous example, values in the substitution table 128 may be modified during the blackout. The "new" substitution table containing the modified values may be assigned a new start time by the back-end logic of the network operator 102 and passed to the appropriate video acquisition servers for communication to the client 104.

In an implementation, the start time for the modified substitution table may be made for a future point in time. This means the video acquisition server of the network operator 102 may continue to send the current substitution table until the new one comes into force. This mechanism allows for arbitrary remapping of virtual channels to services within the substitution collection for each GRC. Since the substitution tables are "stateless," (i.e., the substitution tables do not depend on the last or next table), state information is not maintained within the client 104 and the system 200 is every bit as flexible for the content provider 106 as a programmable IRD-based digital cable blackout system as was traditionally employed without the added cost of the video encoders that encountered in traditional systems.

The service substitution may then be terminated (block 406). For example, Ending a service substitution (e.g., a "blackout") may be accomplished internally to the network operator 102 by setting the blackout vector 130 to enable decoding in each of the GRCs, setting a blackout timestamp in the key identifier structure 210 to zero, and/or ceasing transmission of the substitution table 128. A variety of other examples are also contemplated.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   deriving a substitution table that specifies one or more service substitutions to be performed for content and that specifies particular geographic locations to perform at least one said service substitution, for the at least one said service substitution, the substitution table specifies a service from a substitution collection that is to be displayed in one said particular geographic location in place of a nominal service, the substitution collection is a set of services, each service in the substitution collection corresponding to a different television channel that may be substituted, one for another;

deriving a compressed substitution table from the substitution table, the compressed substitution table comprising the particular geographic locations for which the nominal service is not specified; and forming one or more communications, to be streamed over a packet-switched network to a client device that is to perform the at least one said service substitution, which includes the compressed substitution table and the content that corresponds to the at least one said service substitution.

2. A method as described in claim 1, wherein the substitution table maps the set of services in the substitution collection to particular said geographic locations.

3. A method as described in claim 2, wherein data describing the substitution collection is communicated to the client device out-of-band from the content.

4. A method as described in claim 1, wherein the client device corresponds to the particular geographic location through use of a geographic region code assigned to the client device.

5. A method as described in claim 4, wherein the geographic region code is communicated to the client device out-of-band from the content.

6. A method as described in claim 4, wherein the geographic region code is communicated to the client device out-of-band from the content with one or more keys that are usable by the client device to access the content.

7. A method as described in claim 1, wherein the one or more communications include a blackout vector configured as a bit-mapped data structure that is carried with digital rights management (DRM) information of the content.

8. A method as described in claim 7, wherein:
the substitution table is formed as a real-time protocol (RTP) header extension; and
the blackout vector is included in an entitlement control message (ECM) in the content to be streamed to the client device.

9. A method as described in claim 7, wherein the blackout vector provides for cryptographic enforcement of the one or more service substitutions.

10. A method comprising:
receiving a geographic region code (GRC) assignment at a client device that specifies a particular geographic location to which the client device belongs;
receiving a compressed substitution table at the client device, the compressed substitution table is derived from a substitution table that specifies one or more service substitutions to be performed for content and a blackout vector that specifies one or more geographic locations to perform at least one said service substitution, for the at least one said service substitution, the substitution table specifies an alternative television channel from a substitution collection that is to be displayed in place of a primary television channel in one said geographic location, the compressed substitution table comprising the one or more geographic locations for which the primary television channel is not specified; and
responsive to a determination that the particular geographic location to which the client device belongs corresponds to the one or more geographic locations specified by the compressed substitution table, performing at least one said service substitution at the client device as indicated by the compressed substitution table.

11. A method as described in claim 10, wherein the receiving of the compressed substitution table at the client device is performed as a part of content that is streamed to the client device and is subject to the at least one said service substitution.

12. A method as described in claim 10, wherein the receiving of the geographic region code (GRC) assignment is performed out-of-band at the client device from the content.

13. A method as described in claim 10, wherein the receiving of the geographic region code (GRC) assignment is performed as a part of entitlement control message (ECM) information for the content.

14. A method as described in claim 10, wherein the receiving of the compressed substitution table at the client device is performed via a packet-switched network.

15. A system comprising one or more modules implemented as least partially in hardware to perform operations comprising substituting services from a substitution collection for a nominal service of the substitution collection using a compressed substitution table comprising particular geographic locations of one or more geographic locations for which the nominal service is not specified and derived from a substitution table that carries a mapping of the services that are to be displayed and a blackout vector that indicates whether a current stream of content is decodable based on the one or more geographic locations, the nominal service of the substitution collection is mapped to a particular location in an electronic program guide (EPG), the particular location in the EPG does not change while the services of the substitution collection are substituted for the nominal service.

16. A system as described in claim 15, wherein the compressed substitution table is carried in a real-time protocol (RTP) header extension.

17. A system as described in claim 15, wherein the blackout vector is carried as a part of enterprise content management (ECM) along with a pointer to a particular said substitution table that is in-force.

* * * * *